United States Patent [19]

Zaidenweber

[11] 4,423,456

[45] Dec. 27, 1983

[54] BATTERY REVERSAL PROTECTION

[75] Inventor: Gary A. Zaidenweber, St. Paul, Minn.

[73] Assignee: Medtronic, Inc., Minneapolis, Minn.

[21] Appl. No.: 321,037

[22] Filed: Nov. 13, 1981

[51] Int. Cl.$^3$ .............................................. H02H 9/00
[52] U.S. Cl. ........................................ 361/77; 361/58;
361/88; 307/127; 307/262; 320/25; 320/26
[58] Field of Search ..................... 361/77, 58, 76, 88,
361/91, 101; 307/200 A, 255, 262, 127, 303;
320/25, 26; 357/35, 48, 51

[56] References Cited

U.S. PATENT DOCUMENTS

| | | | |
|---|---|---|---|
| 2,972,710 | 2/1961 | D'Amico | 317/148.5 |
| 3,009,115 | 10/1961 | Johnson | 331/113 |
| 3,267,301 | 8/1966 | Gignac | 307/127 |
| 3,313,995 | 4/1967 | Bach et al. | 320/25 |
| 3,571,608 | 3/1971 | Hurd | 307/93 |
| 3,620,220 | 10/1971 | Murphy, Jr. | 128/419 P |
| 3,700,999 | 10/1972 | Gourse | 320/26 |
| 3,783,877 | 1/1974 | Bowers | 128/419 P |
| 3,819,951 | 6/1974 | Moore | 361/77 |
| 3,819,951 | 6/1974 | Moore | 307/202 |
| 3,829,709 | 8/1974 | Maigret et al. | 307/202 |
| 3,839,679 | 10/1974 | Hughes | 328/127 |
| 3,944,891 | 3/1976 | McDonald et al. | 317/48 |
| 4,086,624 | 4/1978 | Fraley | 363/127 |
| 4,171,512 | 10/1979 | Tsuda | 361/77 X |

Primary Examiner—Patrick R. Salce
Attorney, Agent, or Firm—Glenn W. Bowen; John L. Rooney; Joseph F. Breimayer

[57] ABSTRACT

A semiconductor circuit for protecting battery powered electronic devices from damage due to polarity reversal. A metal oxide semiconductor is employed in series with the power source to switch the power input as appropriate. A first embodiment simply disables the power source input upon improper polarity. A second embodiment actually reverses the effective polarity to the load. Because the source-to-drain impedance of the metal oxide semiconductor device is resistive, a number of protection devices may be used in parallel to achieve an artibrarily low voltage drop between power source and load for a given current drain.

1 Claim, 3 Drawing Figures

BATTERY REVERSAL PROTECTION

BACKGROUND OF THE INVENTION

1. Field of the Invention

The present invention relates generally to electrical circuits and more specifically to devices to protect electrical circuits from damage due to polarity reversal of the power supply.

2. Description of the Prior Art

The earliest devices which provide protection for circuitry from polarity reversal are electromechanical in nature. U.S. Pat. No. 3,267,301 issued to Gignac discloses such a circuit using a relay for polarity reversal protection. Because of the reliability limitation of relays, subsequent designs often included diodes such as disclosed in U.S. Pat. No. 3,313,995 issued to Bach et al.

Subsequent polarity reversal protection circuits used semiconductor devices to replace the electromagnetic relays. These circuits such as taught by Hurd in U.S. Pat. No. 3,571,608, Maigret et al in U.S. Pat. No. 3,829,709 and Moore in U.S. Pat. No. 3,819,951 use transistors to affect the switching of power source to load current.

Because of the high current requirements of polarity reversal protection circuits, the semiconductors used in the prior art are typically bipolar in nature. This results in a constant voltage drop across the polarity reversal protection circuit within the intended current range of the system. For relatively high power systems, this is acceptable. However, for many low power applications, a smaller and arbitrarily lower voltage drop is desirable or required. Even though Moore, for example, suggests the use of metal oxide semiconductors, the prior art does not teach a polarity reversal protection circuit having an arbitrarily low voltage drop.

SUMMARY OF THE INVENTION

The present invention employs metal oxide semiconductors in the protection devices. Because the source to drain current experiences a resistive voltage drop, the protection devices may be coupled in parallel to achieve a total in-series resistance between power source and load of as low of a value as required.

The present invention is configured into two modes. The first of these merely opens the power source to load circuit upon polarity reversal. The second mode actually reverses the power source load if required. In either mode, however, the protection devices appear as a resistive voltage drop between the power source and load. Therefore, paralleling protection devices of either mode will present an arbitrarily low resistive voltage drop between the power source and the load.

DETAILED DESCRIPTION OF THE PREFERRED EMBODIMENTS

The preferred modes of practicing the present invention involve application to battery operated medical devices. Battery operation of such devices is preferred for safety reasons when connection is made to internal or implanted electrodes. Battery polarity reversal is quite possible and even likely with such devices under certain emergency and patient controlled situations. However, the present invention is applicable to other non-medical electronic devices and will be viewed as relevant thereto from the following description.

Figure 1:
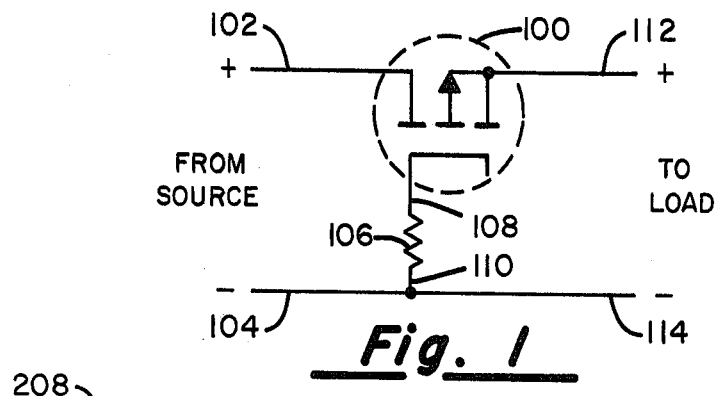
FIG. 1 is a schematic diagram of a protection device of the simpler mode.

FIG. 1 is a schematic diagram of a protection device of the mode of practicing the present invention wherein the power source to load circuit is merely opened upon polarity reversal. Semiconductor 100 is a P channel enhancement metal oxide semiconductor (MOS) field effect transistor (FET). Semiconductor 100 may be of a common type such as part number IRFD 9121. The source is coupled to the positive terminal 102 of the source as shown. The drain of semiconductor 100 is coupled to positive terminal 112 of the load.

Resistor 106 has a value of 10 megohms. It is coupled between the negative terminal 104 of the source and gate 108 of semiconductor 100. Resistor 106 is chosen to ensure minimal current flow via channel 108. Negative terminal 104 of the source is also coupled directly to negative terminal 114 of the load.

If the power source (i.e., removable battery) is applied with proper polarity (i.e., battery positive to positive terminal 102 and battery negative to negative terminal 104), gate 108 is negative with respect to the source of semiconductor 100 and current flows from the source to the drain of semiconductor 100. This represents normal operation. The voltage drop across semiconductor 100 is the source to drain resistance (typically 0.5 ohm) times the source-to-drain current. Should the power supply polarity be reversed by improper battery insertion, gate 108 becomes more positive than the source of semiconductor 100. This effectively results in an infinite source-to-drain resistance in semiconductor 100, thereby protecting the load from the polarity reversal.

Figure 2:
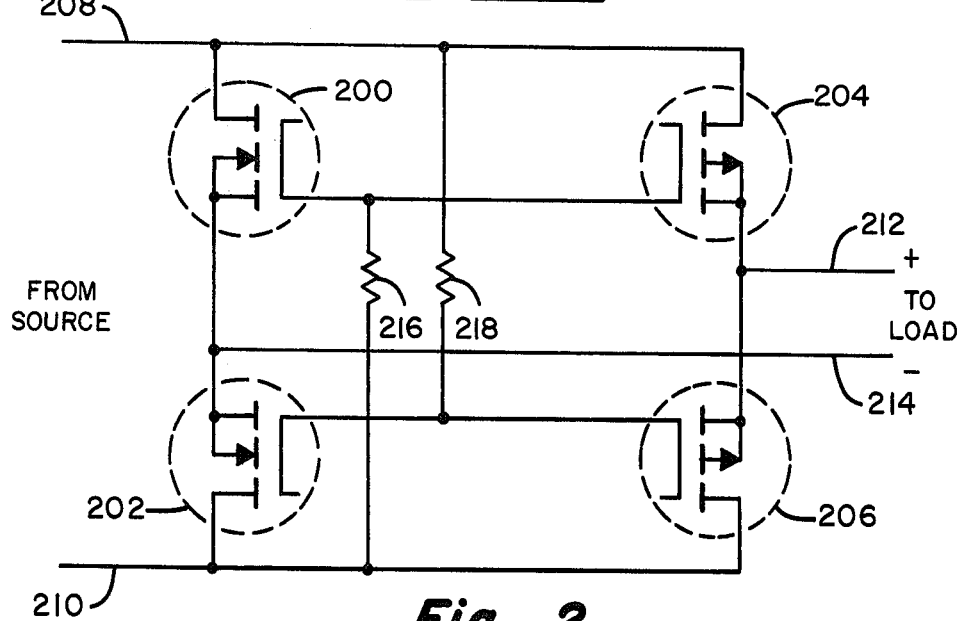
FIG. 2 is a schematic diagram of a protection device of the reversal mode.

FIG. 2 is a schematic diagram of a more sophisticated mode of practicing the present invention. In this mode the power source is applied between lines 208 and 210 in either polarity. The protection device switches the input such that line 212 to the load is always always positive and line 214 to the load is always negative.

Semiconductors 200 and 202 are N channel enhancement MOS FET devices of type IRFD 111. Semiconductors 204 and 206 are similar types. Resistors 216 and 218 have a value of 10 megohms. Resistor 216 biases the gates of semiconductors 200 and 204. Similarly, bias for the gates of semiconductors 202 and 206 is supplied via resistor 218.

Whenever line 208 is positive and line 210 is negative, semiconductors 204 and 202 conduct (semiconductors 200 and 206 do not conduct) to complete the circuit to lines 212 and 214 respectively. Similarly, whenever line 208 is negative and line 210 is positive, semiconductors 200 and 206 conduct (semiconductors 202 and 204 do not conduct) to complete the circuit to lines 214 and 212, respectively. Thus, proper polarity is applied to the load via lines 212 and 214 with either polarity supplied by the power source to lines 208 and 210.

Figure 3:
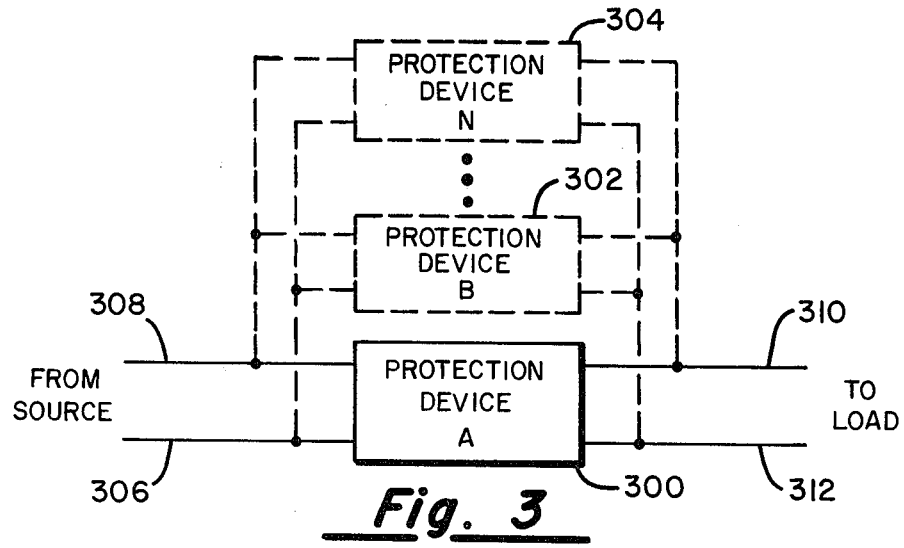
FIG. 3 is a representation of the manner in which the desired voltage drop is obtained by paralleling protection devices.

FIG. 3 is a generalized representation of the manner in which protection devices of either type (i.e., type shown in FIG. 1 or type shown in FIG. 2) may be coupled in parallel to decrease the effective voltage drop from the source (coupled to lines 306 and 308) to the load (coupled to lines 310 and 312). If protection device A 300 has a resistance of 1.0 ohm, the addition of an identical protection device B 302 in parallel lowers the circuit resistance to 0.5 ohm. In general, if each protection device has a resistance of R, the total resistance, $R_T$ of n protection devices in parallel becomes:

$$\frac{(R)(n)}{Rn} (R_1 + R_2 + \ldots + R_n)^{-1}$$

of course, only one type of protection device may be used in a given circuit.

Thus, it can be seen that the present invention provides polarity reversal protection and can present as small of an in-series resistance as required. Those of skill in the art will be readily able to apply the teachings found herein to many similar circuits.

What is claimed is:

1. A polarity reversal protection circuit connectable between a pair of source lines and a pair of load lines comprising:

- first and second field-effect transistors of a first channel type having their source-drain paths connected in series across said source lines; and,
- third and fourth field-effect transistors of a second channel type having their source-drain paths connected in series across said source lines and in parallel with the source-drain paths of said first and second transistors; and,
- wherein the gate electrodes of said first and third transistors are directly coupled together and to only one of said source lines and the gate electrodes of said second and fourth transistors are directly coupled together and to only the other of said source lines; and,
- one of said load lines is connected to the junction point of the drains of said first and second transistors; and,
- the other of said load lines is connected to the junction point of the drains of said third and fourth transistors.

* * * * *